No. 766,753.

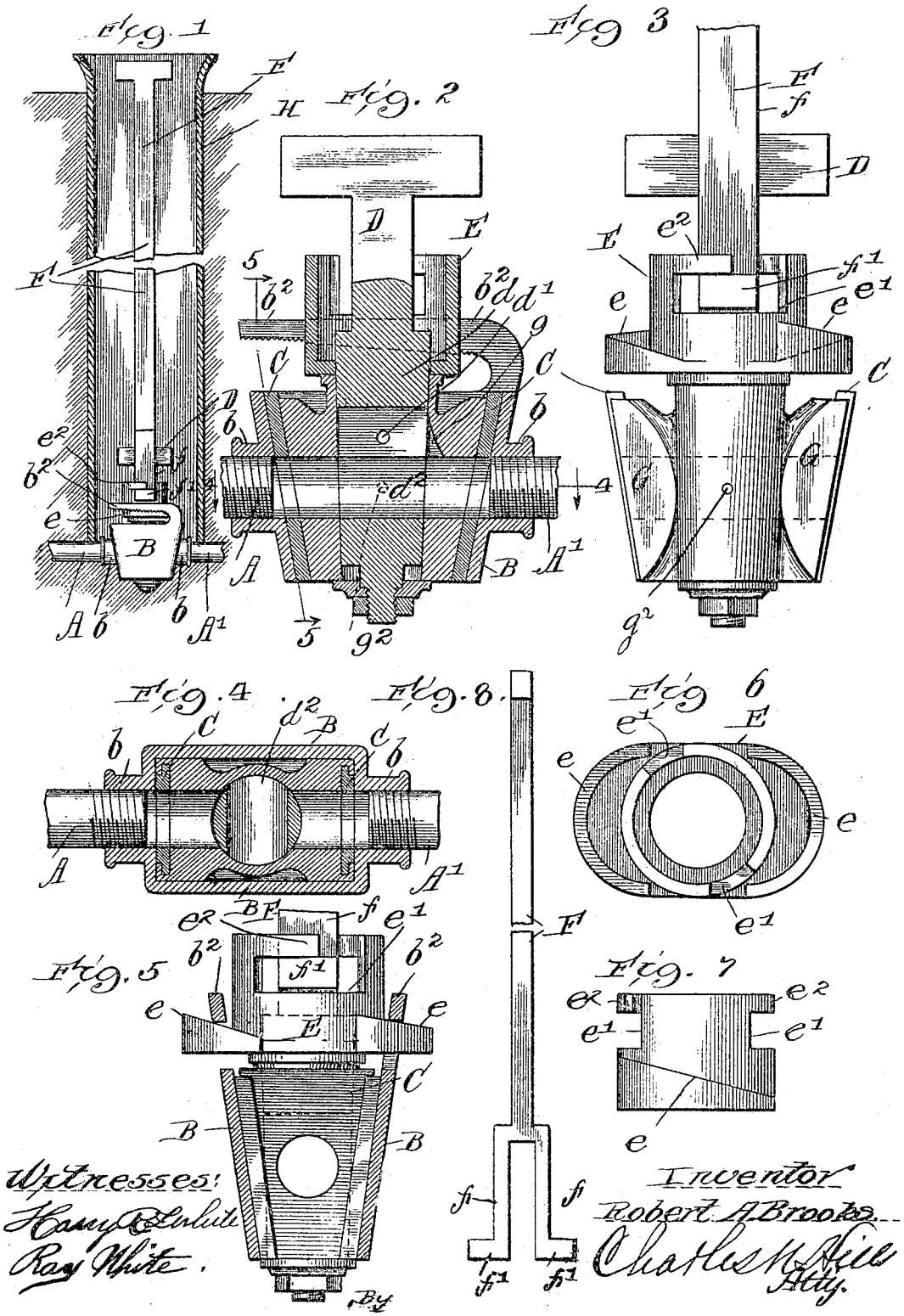

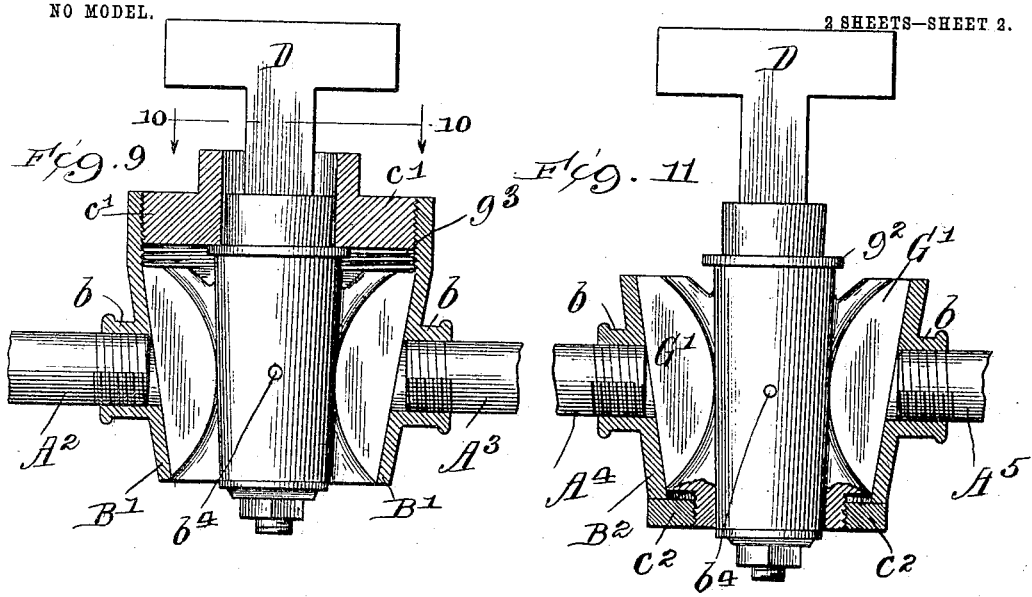
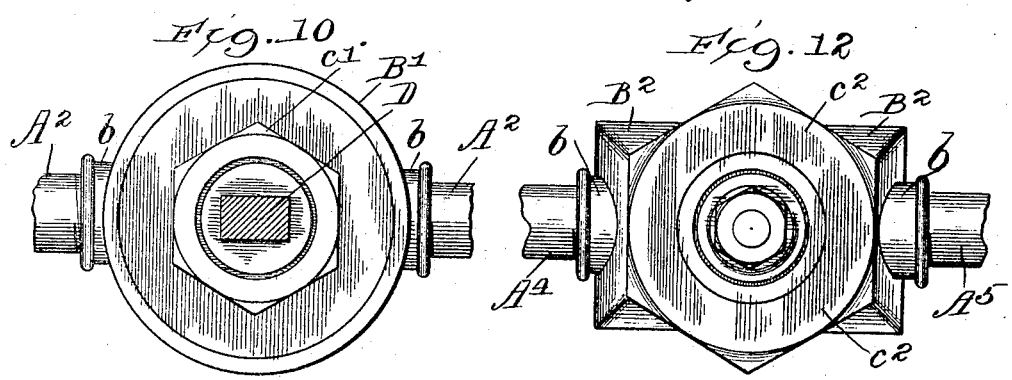
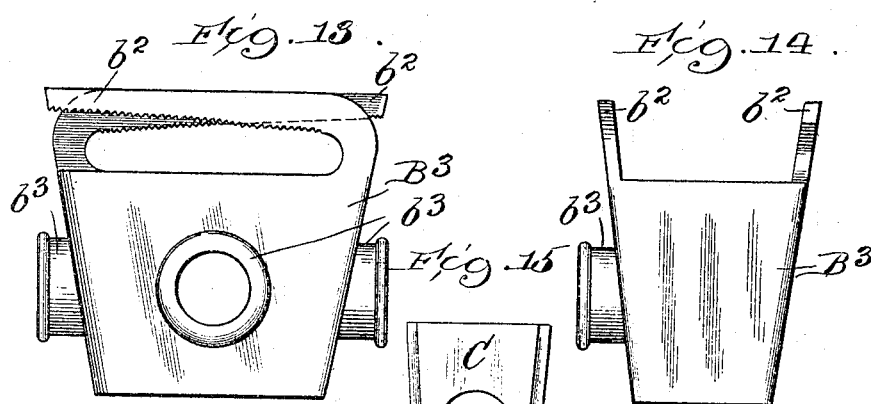

Patented August 2, 1904.

UNITED STATES PATENT OFFICE.

ROBERT A. BROOKS, OF CHICAGO, ILLINOIS.

MEANS FOR CONNECTING VALVES IN PIPES OR THE LIKE.

SPECIFICATION forming part of Letters Patent No. 766,753, dated August 2, 1904.

Application filed March 11, 1903. Serial No. 147,335. (No model.)

*To all whom it may concern:*

Be it known that I, ROBERT A. BROOKS, a citizen of the United States, and a resident of the city of Chicago, county of Cook, and State of Illinois, have invented certain new and useful Improvements in Means for Connecting Valves in Pipes or the Like; and I do hereby declare that the following is a full, clear, and exact description of the same, reference being had to the accompanying drawings, and to the letters of reference marked thereon, which form a part of this specification.

This invention relates more particularly to means for connecting valves with pipes or the like in such a manner as to enable the valve to be removed when desired and a new valve inserted without disturbing the pipe connections. Heretofore it has been usual to connect pipes directly with the valve-casing by threading the same therein, and in the event of the valve proving defective or getting out of order it has been necessary to break the connection of the pipes with the casing, requiring the services of skilled labor and the expenditure of a considerable amount of time and trouble both in removing the valve and in securing a tight joint in re-forming the connection with a new valve. Moreover, where valves are installed in places inconvenient of access—as, for instance, in underground service-pipes—it has been necessary in making changes or repairs to dig down to the valve, thus injuring lawns and necessitating considerable expenditure of time and money.

The object of this invention is to provide a construction adapted to permit the entire valve to be removed from or inserted into the pipe without disturbing the pipe connections or if a waste-cock installed in an underground service-pipe, the cock or valve, if defective, may be removed and a perfect valve substituted without disturbing the soil or the pipe connection.

The invention embraces many novel features; and it consists in the matters hereinafter described, and more fully pointed out and defined in the appended claims.

In the drawings, Figure 1 is a vertical section of a well, showing an underground wastecock, showing the same at the bottom. Fig. 2 is an enlarged vertical section of the cock or valve taken longitudinally of the pipe. Fig. 3 is an enlarged side elevation of the valve and means for locking same in the receptacle, showing the same removed therefrom. Fig. 4 is a section taken on line 4 4 of Fig. 2. Fig. 5 is a section taken on line 5 5 of Fig. 2. Fig. 6 is a plan view of the locking-cam. Fig. 7 is an end elevation of the same. Fig. 8 is a side elevation of the lifting-key. Fig. 9 is a side view showing the receptacle in section and the valve in side elevation and illustrating a modified form of the construction. Fig. 10 is a section taken on line 10 10 of Fig. 9. Fig. 11 is a view similar to Fig. 9, but illustrating a slightly-different means for holding the valve in the receptacle. Fig. 12 is a bottom plan view of the same. Fig. 13 is a view in side elevation of a modified form of the receptacle for the valve. Fig. 14 is an end elevation of the same. Fig. 15 is an elevation of the packing.

As shown in said drawings, A and A', $A^2$, $A^3$, $A^4$, and $A^5$ respectively indicate pipes adapted to convey fluid therethrough and which are permanently connected in pairs in a valve-receptacle B, B', or $B^2$, which, as shown, is provided at a plurality of points with threaded bosses $b$ $b'$, through which the pipes communicate into the receptacle. Said receptacles, as shown, taper symmetrically toward one end transversely of the pipes to receive the valve-casing G, which tapers complementally. Said casing is provided with inlet and outlet orifices or passages in the usual manner, which when the casing is secured in the receptacle register exactly with the inlet and outlet pipes thereof. For the purpose of affording a tight joint between the inlet and outlet orifices of the casing and the inlet and outlet pipes the faces of the casing G, through which orifices open, are recessed and the edges flanged over slightly to receive a resilient packing C, which is apertured to correspond with the orifices in the casing and when the casing is jammed into the receptacle affords a tight packing between the walls of the same, effectually preventing leakage of the fluid from the joint, while affording a free passage through the valve when in operation.

Any desired means may be used for firmly jamming the casing into the receptacle and locking the same therein, and, as shown in Figs. 1, 2, 3, 4, and 5, (in which the construction is shown of a type adapted to be used in locations not readily accessible,) the receptacle is provided at its top on opposite sides with oppositely-directed arms $b^2$, which, as shown, are corrugated or milled on the under surface and incline from the point downwardly on the under side, thus affording on each side of the receptacle at its top oppositely-directed open hooks. Carried on the stem D of the valve is the double cam E, which, as shown, is oblong in shape and is provided at each end with an inclined cam-surface $e$ and is sufficiently narrow to pass between the hooks or arms $b^2$ when turned longitudinally therewith and is adapted when turned transversely of the same, as shown in Figs. 1, 2, and 5, to wedge beneath the same, forcing the valve-casing into the receptacle. To enable the cam E to be operated in positions such as indicated in Fig. 1 or at other locations where not readily accessible, a sleeve E' is provided integral with the cam and extending upwardly above the same and apertured to receive the valve-stem, as shown in Fig. 2. Said sleeve is provided in its upper edge on diametrically opposite sides with downwardly and laterally extending notches $e'$, above each of which for a portion of its width extends an integral tongue of metal $e^2$ in the direction of the downward inclination of the cam-surfaces. A key F of any desired length is provided at its lower end with a yoke adapted to engage over the valve-stem and having at the lower end of its arm $f$ oppositely and outwardly directed ends $f'$, which when the key is inserted over the stem D drop into the notches in the top of said sleeve and permit the cam to be reversely rotated to release the valve-casing from the receptacle. When so reversely rotated, the ends $f'$ engage beneath the tongue $e^2$, thus permitting the valve to be lifted out of the receptacle, as shown in Figs. 1 and 3.

In locations such as indicated in Fig. 1—that is to say, for valves in service-pipes—some provision for waste or draining the fluid from the valve and outlet-pipe when the valve is closed is usually employed. For this purpose, referring to Fig. 2, when the valve is closed, shutting off the inlet-passage A, the water in the outlet passage or pipe A' flows into the recess $g$ in the outlet side of the casing G and thence in the valve-closure through the aperture $d'$ therein through the aperture $g^2$ in the side of the casing, wherein it escapes.

Figs. 9, 10, 11, and 12 illustrate slightly-modified constructions of the means for securing the valve in the receptacle. Figs. 9 and 10 show the upper end of the receptacle B' provided with internal screw-threads and an externally-threaded plug C' apertured to receive the valve-stem and bearing with its under side on the flange $g^3$ of the casing. Said plug is provided at its upper end with an angular portion adapted to be engaged by a wrench or like. Figs. 11 and 12 indicate a construction in which the lower end of the casing G' is threaded to receive an angular nut C', which engages the same and bears against the under side of the receptacle.

The operation is as follows: The pipe ends are connected in the receptacle either in alinement, as shown in Figs. 1 to 12, inclusive, or at any desired angle with each other, as indicated by the bosses $b^3$ in Figs. 13 and 14. The receptacle serves as a pipe-fitting to join the pipe ends. The valve, the casing G or G' of which is shaped externally to fit closely in said receptacle, is inserted therein and rigidly secured in position, with its inlet and outlet orifices registering with the inlet and outlet pipes, and the packing when used forms a tight joint between apertured sides of the casing and receptacle, as shown in Fig. 2 and Fig. 4. The valve is now ready for use.

Obviously it is immaterial what the particular construction of the valve mechanism may be, as obviously ball, globe, gate, plug, or any desired valve may be employed, as preferred, the particular type of valve depending solely upon the service for which required. If in exposed position, the valve may be secured in the receptacle, either as illustrated in Figs. 1 to 7, inclusive, or as shown in Figs. 9 or 11. If, however, the valve is positioned in such a manner as not to be readily accessible—as, for instance, at the bottom of the well H (shown in Fig. 1)—as is common with water or gas service pipes, the hooked arms $b^2$ at the upper end of the receptacle are provided and the cam E provided on the stem, the under side of which bears against the flange on the casing and the cam-surface of which bears beneath said arm and by rotation of which the valve-casing is either firmly engaged in the receptacle or released therefrom, as preferred. While corrugation or milling is shown on the under side of said arms, obviously either the engaging surfaces of the cam or the arm may be milled, roughened, or corrugated, or such milled or rough surfaces may be omitted altogether, as preferred. When it is desired to remove the valve from the receptacle so constructed, the key F is inserted, whereby the cam may be reversely turned, releasing the same from engagement with said arm and permitting the valve to be lifted thereby out of the receptacle or to be returned thereto, if desired.

Obviously many details of construction may be varied without departing from the principles of this invention.

I claim as my invention—

1. The combination in a pipe or the like, of a receptacle fitted therein and communicating therewith, a valve removably engaged in said receptacle in operative relation with the pipe and oppositely-directed arms on said receptacle adapted to force the valves therein.

2. The combination with the pipe ends of a connecting-fitting comprising a tapered receptacle non-circular in cross-section, a valve removably engaged and fitting closely therein and provided with recesses opposite said pipe end and packing means carried in said recesses and affording a tight joint between the orifices in the valves and the pipe ends.

3. The combination with a plurality of pipes, of a fitting non-circular in cross-section forming the connection between the same and through the sides of which the pipes open, a removable valve-casing complemental with the interior of the receptacle and provided with outwardly-opening recesses in the sides thereof adjacent said pipe-openings, packing means carried in said recesses, and a valve removably engaged in said casing.

4. The combination with pipes, of a receptacle connected therein having oppositely-disposed flat sides thereon, a recessed valve-casing having flat sides complemental with those of the receptacle and orificed to correspond with the receptacle, means for removably securing said valve-casing in said receptacle and packing means engaged in said recesses affording a tight joint between the orifices of the casing and the receptacle.

5. A pipe connection comprising a tapered open-ended receptacle non-circular in cross-section and into which pipes communicate, a valve-casing shaped externally to fit in said receptacle adapted to carry the valve and having orifices therein registering with the pipe ends, apertured packing means carried on one of said parts and affording a tight joint between the casing and the pipes and means for removably securing the casing in the receptacle.

6. A pipe connection comprising a tapered receptacle non-circular in cross-section and having oppositely-disposed flat sides therein, pipe ends connected in and opening therethrough, a valve therein, the casing thereof having orifices registering with the pipe ends, a removable packing between the casing and receptacle and means for removably securing said casing in the receptacle.

7. In a device of the class described the combination with a receptacle having a slotted side wall, of pipe connections therein, a valve having a casing adapted to fit closely in the receptacle and orifices registering with the pipe ends and a cam carried on the valve-casing and adapted to engage in said slot and acting to lock the valve in the receptacle.

8. The combination with a receptacle having a slotted side wall, of pipe connections therein, a valve fitting closely in said receptacle and having orifices registering with the pipe ends, a cam carried on the receptacle and adapted to engage in the slot of the receptacle and adapted to be engaged by a key or the like, and a part on said cam adapted to engage over said key when in operation adapting the valve to be lifted thereby.

9. The combination with a receptacle, of pipe connections therein, oppositely-directed hooked arms at the upper end of the receptacle, a valve-casing fitted closely in said receptacle and orificed to register with the pipe ends, a rotative cam carried on the upper end of the valve-casing and horizontal, oppositely-directed tongues thereon adapted to engage over an operating-key whereby the cam may be turned into positive engagement with said arms or released therefrom, said tongues acting to support the valve on the key when disengaged from the receptacle.

10. A receptacle for the purpose specified comprising a tapered shell open on opposite ends and having pipe connections in the side walls thereof, and having hooked arms on oppositely-disposed side walls adapted to afford means for removably securing a valve in the receptacle.

11. A pipe-fitting adapted to connect the ends of pipes and comprising a tapered receptacle having flattened inner sides through which the pipes open, a valve having a casing provided with two or more flat sides complemental with those in said receptacle and means adapted to permit the ready insertion in or removal of the valve from the receptacle while the receptacle is connected with the pipes.

12. In a device of the class described, the combination with pipe ends of a tapered fitting apertured to receive said pipe ends, a complementally-apertured casing non-rotatively engaged therein and provided with packing-seats adjacent said openings, packing means secured in said seats and adapted to be jammed into the fitting with said casing and a valve removably engaged in said casing.

13. A valve for the purpose specified embracing a valve-casing tapered to fit closely in a complemental receptacle having pipe connections therein, said valve-casing having an inlet and outlet orifice adapted to register with the pipe-openings in the receptacle, and a cam carried on the valve-casing adapted to lock the valve in the receptacle.

14. A waste valve or cock of the class described comprising a tapered casing adapted to fit and to be removably secured in a complemental receptacle and having inlet and outlet orifices registering with pipe ends connected with said receptacle, a cam adapted to removably engage the casing in the receptacle, a plug-valve closure extending through the casing and apertured to register with the inlet and outlet orifices and a recess in the outlet side of the casing leading to an aperture through the side thereof.

15. A pipe connection comprising a receptacle having oppositely-disposed flattened interior faces, pipe ends opening therethrough, a valve-casing adapted to fit therein and having two or more flat faces complemental with those of the receptacle and orificed to register with said pipe ends, apertured packing means adapted to engage between the flattened sides of the receptacle and casing about said apertures, and means for removably securing the casing in the receptacle.

16. A pipe connection adapted to receive a valve and comprising an open-ended receptacle having two or more oppositely-disposed, flattened interior sides having pipe-openings therethrough, a valve-casing having orificed sides complemental with the flat sides of said receptacle, packing means carried thereon, and adapted to jam between the flattened sides of the receptacle and casing and form a joint through which said orifices and pipe ends communicate, and means for removably securing the casing in the receptacle.

17. In a pipe connection the combination with a tapered open-ended receptacle having oppositely-disposed flattened sides therein, of an apertured valve-casing having corresponding flattened sides provided each with a vertically-disposed recess, packing means carried in said recesses and adapted when the casing is inserted in the receptacle to afford a guard about the pipe ends and through which the orifices of the valve-casing communicate with said pipe ends, and means for removably securing the casing in the receptacle.

In testimony whereof I have hereunto subscribed my name in the presence of two subscribing witnesses.

ROBERT A. BROOKS.

Witnesses:
   C. W. HILLS,
   S. C. LAIDLEY.